United States Patent [19]
Hill et al.

[11] Patent Number: 6,084,228
[45] Date of Patent: Jul. 4, 2000

[54] DUAL ZONE SOLAR SENSOR

[75] Inventors: Jonathan W. Hill, Scarborough; Thomas E. Harmon, Cumberland, both of Me.

[73] Assignee: Control Devices, Inc., Standish, Me.

[21] Appl. No.: 09/188,824

[22] Filed: Nov. 9, 1998

[51] Int. Cl.[7] ............................... G01J 1/20; G08B 17/12
[52] U.S. Cl. ...................... 250/203.4; 236/1 B; 236/91 C
[58] Field of Search ................................. 250/203.4, 239; 236/49.3, 78 B, 91 C, 1 B; 126/572, 573; 396/65, 274; 165/42

[56] References Cited

U.S. PATENT DOCUMENTS

| | | |
|---|---|---|
| 4,131,540 | 12/1978 | Husome et al. . |
| 4,239,962 | 12/1980 | Oehler . |
| 4,320,288 | 3/1982 | Schlarlack ............................ 250/203.4 |
| 4,477,172 | 10/1984 | Yokota . |
| 4,568,826 | 2/1986 | Pitel et al. . |
| 4,632,542 | 12/1986 | Whiteside . |
| 4,874,938 | 10/1989 | Chuang . |
| 4,896,031 | 1/1990 | Pettersson et al. . |
| 4,933,550 | 6/1990 | Negyi ................................... 250/203.1 |
| 5,234,049 | 8/1993 | Palazzetti et al. ..................... 236/91 C |
| 5,302,815 | 4/1994 | Eggenschwiler . |
| 5,416,318 | 5/1995 | Hegyi . |
| 5,518,176 | 5/1996 | Turner et al. .......................... 236/49.3 |
| 5,602,384 | 2/1997 | Nunogaki et al. . |
| 5,957,375 | 9/1999 | West ....................................... 236/91 C |

*Primary Examiner*—Stephone B. Allen
*Attorney, Agent, or Firm*—Woodard, Emhardt, Naughton, Moriarty & McNett

[57] ABSTRACT

The present invention relates to a dual zone solar sensor incorporating a calibratable diffuser overlying a vertically oriented circuit board having at least one photodetector affixed to either side of the circuit board in a vertical plane. Each detector preferably has a mutually exclusive hemispherical view. By mounting the photodetectors in the vertical plane, the dual zone solar sensor device is capable of providing information about the intensity of a source of incident solar radiation and the relative position of that source of radiation. While the angular responses of the photodetectors in their vertical orientation are very close to those desired by skilled artisans for a dual zone sensor, the addition of a diffuser that is slidable, and therefore calibratable, provides a method by which the angular response of each photodetector may be permanently calibrated to achieve a precise desired angular response. The present inventive combination of features eliminates the need for complex and bulky electronic signal processing circuitry and decreases the number of parts necessary to achieve functions previously achieved only by larger sensors having a far greater number of component parts.

14 Claims, 4 Drawing Sheets ize the scope of the invention, the following description of a preferred embodiment is offered.

DUAL ZONE SOLAR SENSOR

TECHNICAL FIELD OF THE INVENTION

The present invention relates generally to sensors for detecting solar radiation and, more particularly, to a dual zone solar sensor.

BACKGROUND OF THE INVENTION

There exist numerous prior art designs for solar sensors, most of which are complex and expensive and have associated therewith electronic signal analysis systems that are bulky and comprise many minute parts. The complexity of these prior art designs makes them very difficult to manufacture and even more difficult to employ successfully in space-restricted environments such as the interiors of motor vehicles. Additionally, most prior art sensor designs cannot be calibrated to obtain an ideal angular response before leaving the factory, and therefore these designs require the use of complex correction circuitry.

Many prior art sensor designs employ a diffuser to modulate the angular response of a photodetector. For example, U.S. Pat. No. 4,632,542 to Whiteside discloses an exposure control system for use in a photographic camera wherein a diffuser may move into and out of the field of view of a photodetector. Additionally, U.S. Pat. No. 4,477,172 to Yokota discloses a light measuring device for a camera that includes a diffusion plate having three areas of different diffusion characteristics. The diffusion plate is stepwise movable so that one of the diffusion areas is axially aligned with the photodetector at any given time.

While such prior art devices provide desirable features, these desirable features still do not permit one to calibrate the angular response of a photodetector prior to installing the sensor in its end-use location. Therefore, these prior art devices must use complex and expensive electronic signal analysis systems and/or bulky and time-consuming manual movement mechanisms to provide the end user with the desired angular response from the photodetector.

There is therefore a need for a simple and inexpensive solar sensor that can determine the position of a source of incident solar radiation without requiring any special location computation or response correction processing system. That is, there exists a need for a solar sensor that can be calibrated initially to obtain a desired angular response and then fixed with that calibration for the life of the sensor. The present invention is directed toward meeting this need.

SUMMARY OF THE INVENTION

The present invention relates to a dual zone solar sensor incorporating a vertically mounted circuit board having photodetectors mounted on either side of the circuit board. In this vertical orientation, the photodetectors automatically have angular responses close to those desired in a dual zone solar sensor by persons of ordinary skill. The precise desired angular response may be obtained by modifying the original angular response with two diffusers. One diffuser is positioned over each photodetector and is movable horizontally with respect to those photodetectors in order to calibrate the sensor.

Such a configuration permits the skilled artisan to calibrate the sensor and then permanently install the diffusers in the calibrated orientation to thereby minimize part-to-part variation. The simplicity of this design minimizes the number of parts necessary to provide the desired light position information, while simultaneously making it easier to obtain high responses to light close to the horizon. This latter benefit is especially important for controlling the interior environments of motor vehicles.

DESCRIPTION OF THE PREFERRED EMBODIMENTS

For the purposes of promoting an understanding of the principles of the invention, reference will now be made to the preferred embodiments thereof, and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Figure 1:
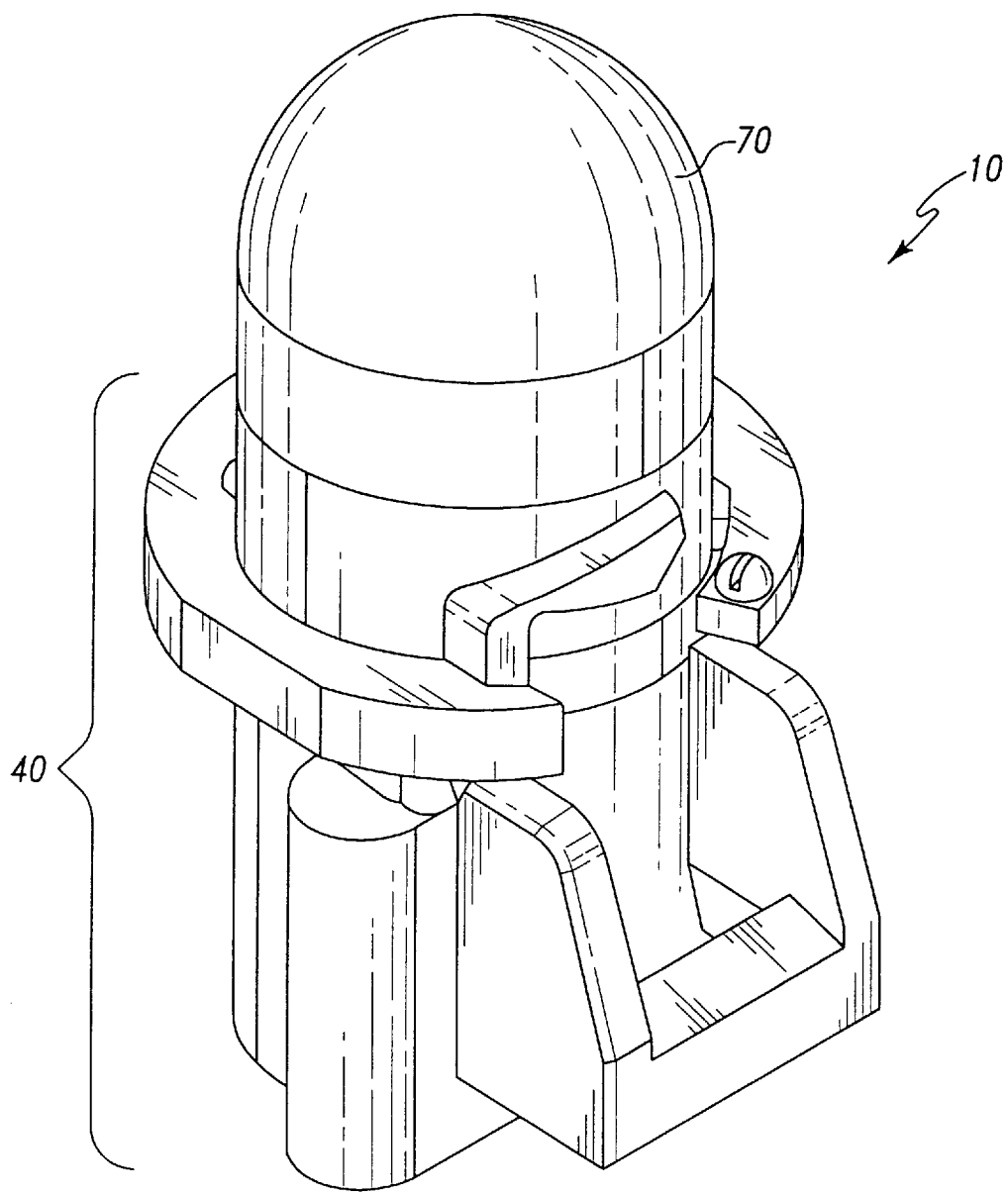
FIG. 1 is a perspective view of a preferred embodiment of the present invention.

Referring to FIG. 1, there is illustrated a preferred embodiment of the present invention, indicated generally at 10. The dual zone solar sensor 10 comprises several components that are illustrated in detail in FIGS. 2 and 3. The dual zone sensor 10 as fully assembled in FIG. 1 shows a cap 70 and a housing 40.

Figure 2:
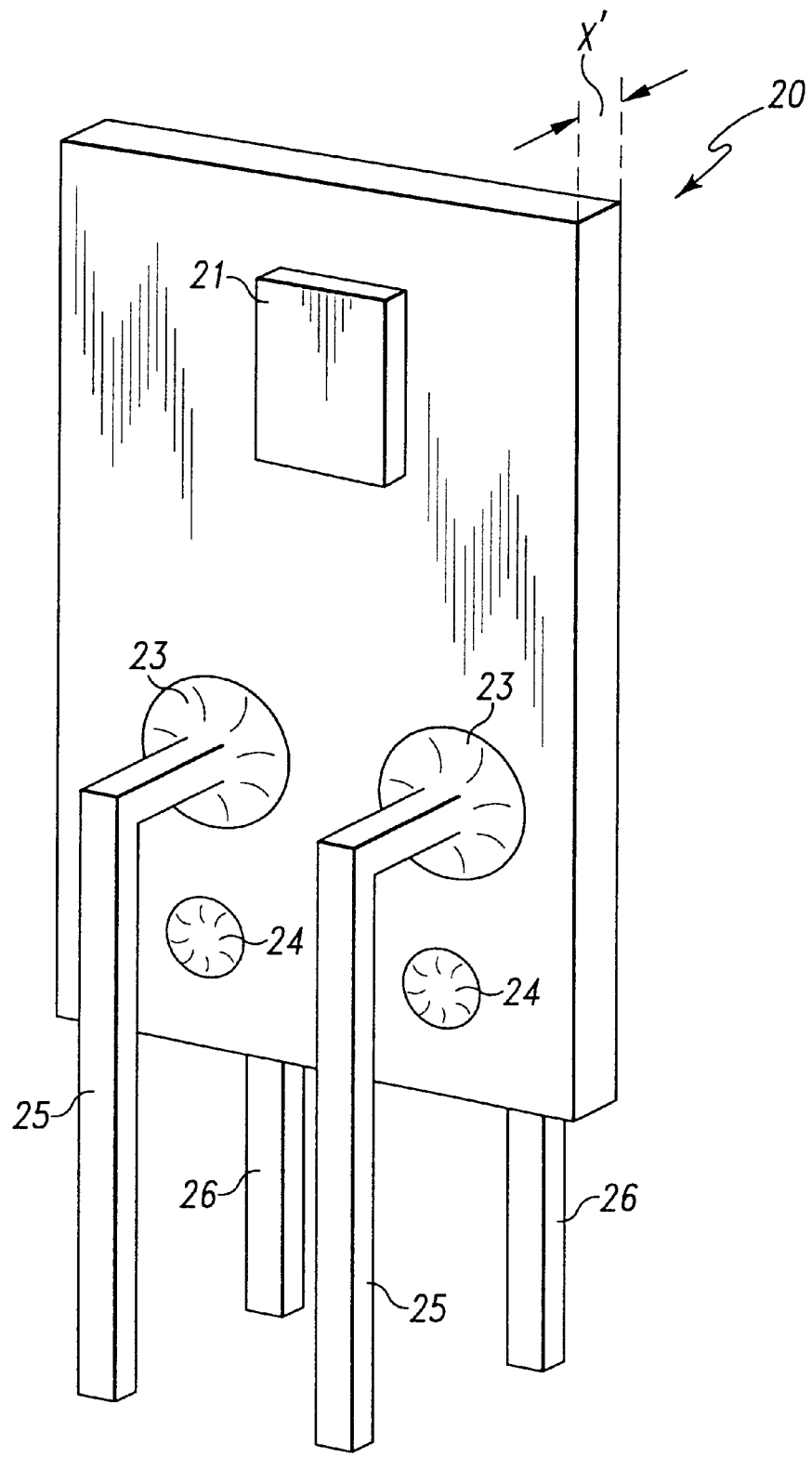
FIG. 2 is a perspective view of a circuit board of the preferred embodiment of FIG. 1.

Turning now to consider FIG. 2, a circuit board 20 according to a preferred embodiment of the present invention is illustrated therein. The circuit board 20 comprises at least one photodetector 21, 22 (see FIG. 4) disposed on each side of the circuit board 20. The circuit board 20 also comprises at least one aperture for each photodetector through which a terminal may pass and be connected to the circuit board 20. In a most preferred embodiment illustrated in FIGS. 2 and 4, there are two apertures 23 defined through the circuit board 20 that are connected by circuits to the photodetector 21. This most preferred embodiment also comprises apertures 24 defined through the circuit board 20 and connected by circuitry to the photodetector 22 on an opposite side of the circuit board 20 from the side containing the photodetector 21. The apertures 23 are adapted to receive long terminals 25 and the same are illustrated in their attached position on the circuit board 20. Similarly, apertures 24 are adapted to receive short terminals 26 and the same are illustrated in their attached configuration.

Although the apertures 23 are illustrated with the long terminals 25 and the apertures 24 are illustrated with the short terminals 26, those of ordinary skill will recognize that the positions of the apertures 23, 24 are unimportant, so long as at least one terminal of a desired length may be mounted to the circuit board 20 and connected by circuitry to at least one photodetector. Therefore, all variations in the placement and size of the apertures 23, 24 and the terminals 25, 26 that are capable of transferring an electronic signal from a photodetector to a remote electronic processor are contemplated by and intended to come within the scope of the present invention. It is also to be understood that, in other embodiments of the invention, the photodetectors 21, 22 could have other configurations besides those in FIG. 2, such as circular configurations, or any shape.

Figure 3:
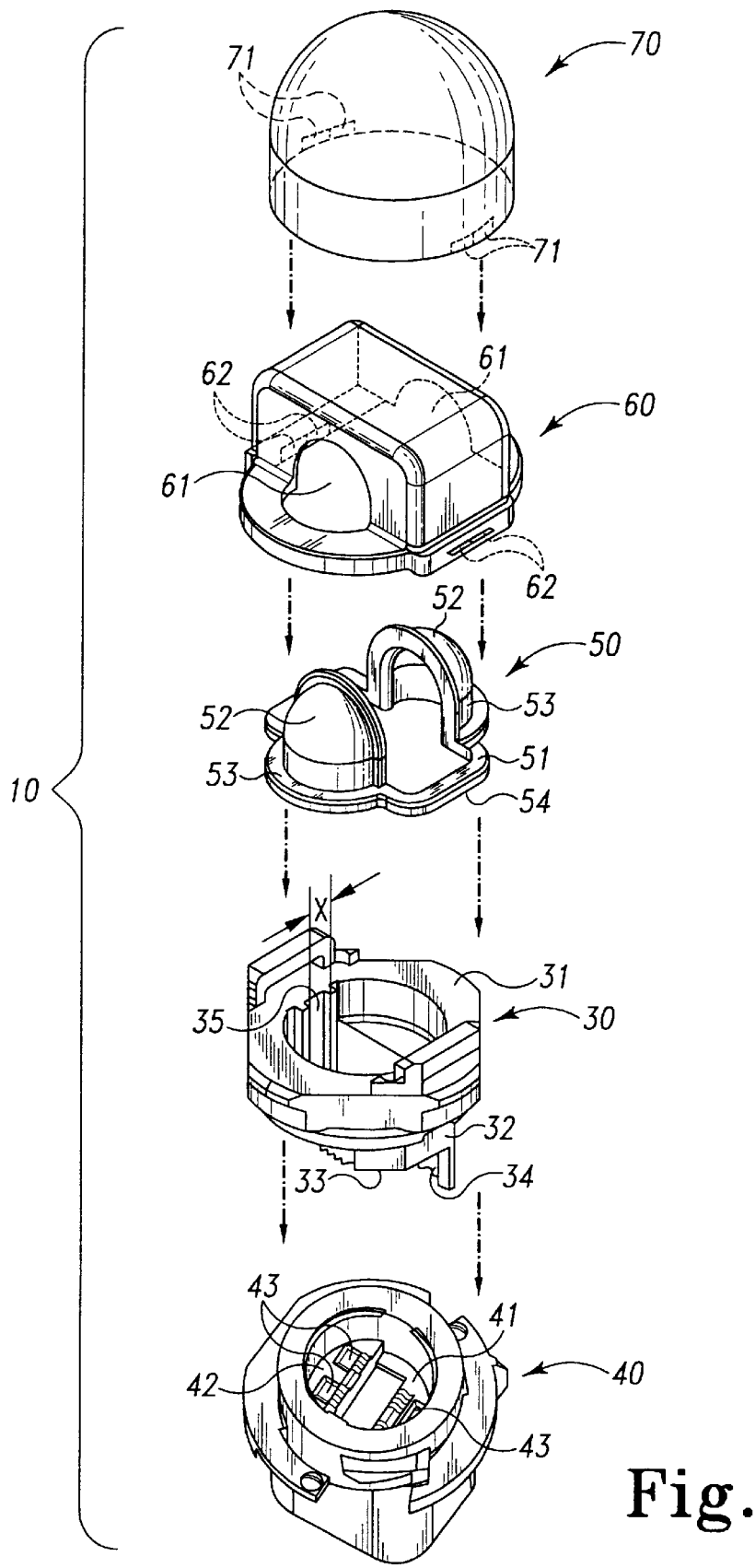
FIG. 3 is an exploded perspective view of a cap, an optic separator, a diffuser, a diffuser retainer, and a housing of the preferred embodiment of FIG. 1.
Figure 4:
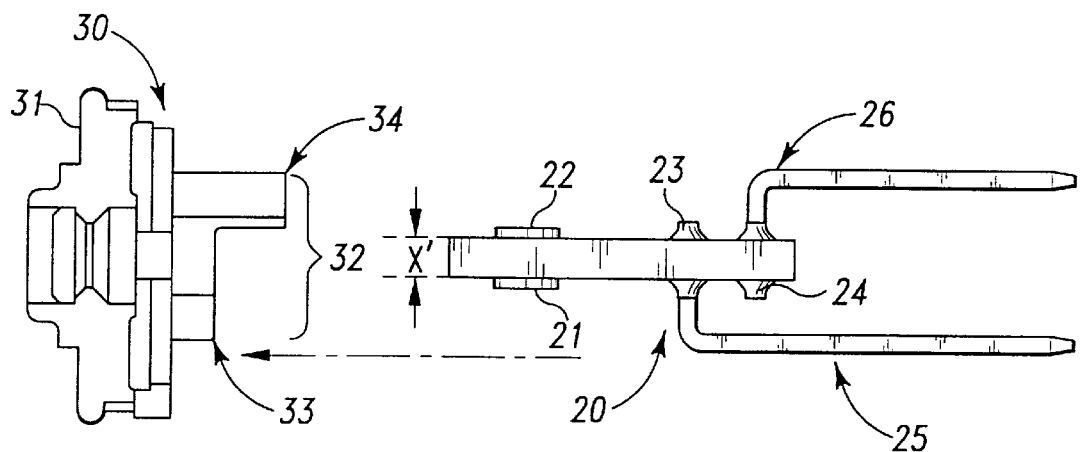
FIG. 4 is an exploded side elevational view of the circuit board of FIG. 2 and the diffuser retainer of FIG. 3.

With reference to FIGS. 3 and 4, the components comprising the most preferred embodiment of the present invention are illustrated therein. The dual zone sensor 10 comprises the cap 70, an optic separator 60, a diffuser 50, a diffuser retainer 30 adapted to retain the diffuser 50 in position over the circuit board 20, and the housing 40. The housing 40 is adapted to slidably mate with the diffuser retainer 30 to thereby maintain the optic separator 60, the diffuser 50, the circuit board 20, and the diffuser retainer 30 in place and protect the circuit board 20 from damage. The cap 70 is adapted to overlie the optic separator 60, the diffuser 50, the diffuser retainer 30, and the circuit board 20 when these components are assembled in order to protect these components from damage.

The diffuser retainer 30 comprises an upper surface 31, a lower surface 32 having a short side 33 and a long side 34, and a vertical channel 35 disposed within an interior circumference of the diffuser retainer 30. The channel 35 is preferably provided with a channel width x that corresponds closely to a width x' of the circuit board 20. As demonstrated in the exploded view of FIG. 4, the channel 35 is adapted to slidably receive the circuit board 20 and maintain it in a substantially vertical orientation with regard to the housing 40 and the diffuser 50.

The short side 33 and the long side 34 of the diffuser retainer 30 are adapted to maintain a spaced relationship between the diffuser retainer 30 and the terminals 25, 26 of the circuit board 20. More precisely, the short side 33 is adapted to maintain a spaced relationship between the diffuser retainer 30 and the long terminals 25 of the circuit board 20, while the long side 34 is adapted to maintain a spaced relationship between the diffuser retainer 30 and the short terminals 26, when the circuit board 20 engages the channel 35. In this way, the most preferred embodiment of the present invention prevents upward movement of the terminals 25, 26, and the fatigue associated therewith, during installation of the dual zone sensor 10 in its end-use location. This stepped configuration of the most preferred embodiment of the diffuser retainer 30 therefore helps prevent damage to the terminals 25, 26 and makes the dual zone sensor 10 easier to manufacture.

As shown in FIG. 3, the most preferred embodiment of the present invention contemplates use of the housing 40, which is adapted to slidably receive and mate with the diffuser retainer 30 and the circuit board 20. The external stepped configuration of the lower surface 32 of the diffuser retainer 30 is mirrored in certain interior surfaces of the housing 40. For example, a first mating surface 41 defined within the housing 40 is adapted to receive and mate with the long side 34 of the diffuser retainer 30. Similarly, a second mating surface 42 is defined within the interior surface of the housing 40 that is adapted to receive and mate with the short side 33 of the diffuser retainer 30. Apertures 43 are defined through the first mating surface 41 and the second mating surface 42. These apertures are adapted to slidably receive the terminals 25, 26 of the circuit board 20 and are sized to minimize lateral movement of the terminals 25, 26 throughout the life of the dual zone sensor 10.

Figure 5:
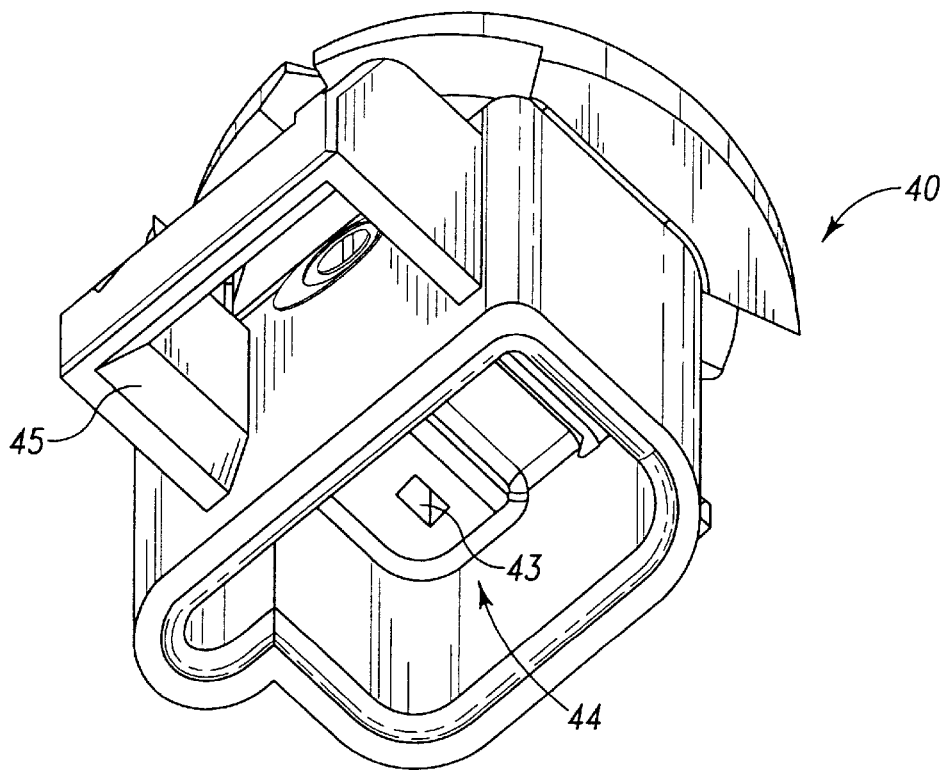
FIG. 5 is a perspective view of the housing of FIG. 3.

As shown more clearly in FIG. 5, the apertures 43 of the housing 40 extend from the first and second mating surfaces 41, 42 to a plug cavity 44 defined within an underside of the housing 40. When the circuit board 20 and diffuser retainer 30 are installed within and mated with the housing 40, the terminals 25, 26 protrude into the plug cavity 44 to create a male-type plug configuration that may be mated with any suitable female-type receptacle (not shown).

Those of ordinary skill will recognize that the most preferred embodiment of the housing 40 is provided with a clip 45 that is adapted to receive and releasably engage a suitable wiring harness (not shown). It will be understood that this clip 45 may take any of a number of configurations adapted to retain wiring, and such configurations are intended and contemplated to come within the scope of the present invention. The present invention also contemplates the use of no clip when space demands dictate that the relevant wiring be located away from the dual zone sensor 10.

Referring again to the exploded view of FIG. 3, the calibratable diffuser feature of the present invention will now be described. The diffuser 50 comprises a base 51 having an upper surface 53 and a lower surface 54 and at least one diffuser lens 52 formed integral with the upper surface 53. While the most preferred embodiment of the present invention displays two diffuser lenses 52 placed in a parallel configuration and having a space between them sufficient to accommodate the width x' of the circuit board 20, those of ordinary skill in the art will recognize that there exist many configurations for the diffuser lenses 52 that would accomplish the objective of providing a calibratable angular response to a photodetector, such as, for example, a single diffuser lens, with or without a base, that would overlie each of the photodetectors 21, 22 and be movable relative thereto. As well, the shape of the diffuser 50 may be designed so that its angular response matches that desired for a given application. These configurations are therefore contemplated by and intended to come within the scope of the present invention.

The lower surface 54 of the diffuser 50 is substantially planar in order to allow for lateral sliding movement of the diffuser 50 on the substantially planar upper surface 31 of the diffuser retainer 30. This lateral sliding movement allows the dual zone solar sensor 10 to be calibrated by moving the diffuser 50 on the upper surface 31 of the diffuser retainer 30 until the precise desired angular response is obtained from the photodetectors 21, 22.

The optic separator 60 defines apertures 61 therethrough through which the diffuser lenses 52 of the diffuser 50 protrude when the diffuser 50 and the optic separator 60 are assembled. The optic separator 60 is adapted to overlie the diffuser 50, and the apertures 61 are adapted to receive the diffuser lenses 52 therewithin. The optic separator 60 is also provided with clips 62 with which corresponding détentes 71 in the interior of the cap 70 can releasably engage to thereby lock the cap in position over the entire assembly of the diffuser retainer 30, the circuit board 20, the diffuser 50, and the optic separator 60. As with the other components of the present invention, those of ordinary skill will recognize that the optic separator 60 may assume a number of configurations that would be effective to create a bounded field of view for each photodetector 21, 22 and thereby enhance the ability of the photodetectors 21, 22 to obtain high responses to light close to the horizon. Those various configurations are therefore intended and contemplated to come within the scope of the present invention.

Once all the components except the cap 70 have been assembled as described above, the angular response of each of the photodetectors 21, 22 is measured and, if any deviations from the precise desired angular response are present, the diffuser 50 and the overlying optic separator 60 are laterally adjusted to calibrate the device and thereby obtain the precise desired angular responses from each of the photodetectors 21, 22. The diffuser 50 and the optic separator 60 are then attached to the upper surface 31 of the diffuser retainer 30 by any means known in the art, including, by way of example and not of limitation, by ultrasonic welding or the like.

After the diffuser 50 and optic separator 60 are so attached, the cap 70 may be installed over the optic separator 60 and the clips 62 engaged with the détentes 71 of the cap to thereby lock the cap in place and form the dual zone sensor 10 as shown in FIG. 1. The cap 70 is preferably not a light modulator and is present mainly to protect the sensitive components contained thereunder. Those of ordinary skill in the art, however, will recognize that, although the cap 70 is not a light modulator in the most preferred embodiment of the present invention, there exist uses to which the present invention may be put for which a light-modulating cap would be desirable. A light-modulating cap is therefore contemplated and intended to come within the scope of the present invention.

In operation, the dual zone sensor 10 is installed, for example in the interior of a motor vehicle, in a location where it is capable of receiving incident solar radiation. The optic separator 60 ensures that the photodetector 21 will receive incident solar radiation from a direction opposite that of the incident radiation received by the photodetector 22 and that both photodetectors 21, 22 will have strong responses to incidental radiation close to the horizon.

Each of the photodetectors 21, 22 is provided with a respective output terminal 25, 26 for providing an output electrical signal that is responsive to an input light from the source of incident radiation. In this manner, the output electrical signals, in combination, are responsive to the position of the source of light. Because each photodetector 21, 22 is mounted on an opposite side of the circuit board 20, each detector 21, 22 therefore has a mutually exclusive hemispherical view. The maximum response of a given detector occurs when the light source is perpendicular to the detector, and when one detector's response is at its maximum, the other detector will have a very low response. The only light reaching the other detector in this situation would presumably be from stray light leakage or reflections. The device therefore provides information about the intensity of the light source and basic information about the relative position of the light source with respect to the photodetector 21, 22.

The most preferred embodiment of the present invention is designed for use in an automobile in order to obtain information about light source intensity and relative position of the light source in order to adjust the vehicle's air conditioning system. It will be appreciated by those of skill in the art, however, that while the dual zone solar sensor 10 is suitable for use as an air conditioning control element or the like, it may find application in numerous other areas. Because the dual zone sensor of the present invention is small, easy to manufacture, and has very few parts, this sensor may be used in any application that requires use of a rugged sensor to determine the position and intensity of a source of radiation.

The foregoing arrangement provides several advantages over prior art solar sensors. First, because the photodetectors 21, 22 are mounted on opposite sides of the circuit board 20 and their respective fields of view are bounded by the optic separator 60, the dual zone solar sensor 10 of the present invention does not need to calculate the position of the sun using complex, delicate, and bulky circuitry and other electronic signal processing components. Second, as another result of the photodetectors' 21, 22 orientation, the present invention does not require use of an external light modulator to limit the detectors' field of view. Rather, the detectors of the present invention are mounted to the circuit board 20 so that their respective fields of view are determined by their orientation on the circuit board 20.

A further advantage of the dual zone solar sensor 10 of FIG. 1 results from the fact that the diffuser 50 is movable with respect to the diffuser retainer 30 and is therefore calibratable with respect to the photodetectors 21, 22. Once calibrated, the device of the present invention may be permanently mounted in place, thereby eliminating the need for any correction factor processing circuitry and eliminating the problems associated with such circuitry.

It will be appreciated from the above description that the dual zone solar sensor device of the present invention offers significant advantages over prior art devices. No prior art device offers the desirable combination of features including a vertically mounted circuit board having at least one photodetector mounted on either side; a component configuration that minimizes lateral and vertical movement, and thus fatigue, on the terminals attached to the circuit board; and a manufacturer-calibratable diffuser, all of which features allow the dual zone solar sensor of the present invention to be simple, compact, and rugged. All of these features are conveniently provided for in the present invention.

While the invention has been described in detail in the foregoing description, the same is to be considered as illustrative and not restrictive in character, it being understood that only the preferred embodiments have been shown and described, and that all changes and modifications that come within the spirit of the invention are desired to be protected.

What is claimed is:

1. A photosensor arrangement comprising:
   a circuit assembly having a vertical axis, said vertical axis defining a vertical plane, at least one first side, and at least one second side opposite said at least one first side, said at least one first side and said at least one second side being located substantially in said vertical plane;
   at least one first photosensor attached to said at least one first side;
   at least one second photosensor attached to said at least one second side; and
   a diffuser arranged substantially perpendicular to said vertical axis to overlie said at least one first and second photosensors, said diffuser being movable with respect to said at least one first and second photosensors; wherein
   said at least one first and second photosensors, respectively, have a substantially planar light-sensitive surface for receiving an input light from a source of light and further having an output terminal for providing an output electrical signal responsive to said input light; and wherein
   horizontal movement of said diffuser assembly determines a quantity of said input light transmitted to each of said at least one first and second photosensors.

2. The photosensor arrangement of claim 1, wherein said diffuser comprises:
   a diffuser support; and
   at least one diffuser lens mounted on said diffuser support.

3. The photosensor arrangement of claim 2, and further comprising a cap arranged substantially perpendicular to said vertical axis to overlie said diffuser and said circuit assembly.

4. The photosensor arrangement of claim 1, and further comprising an optic separator arranged substantially perpendicular to said vertical axis to overlie said diffuser and said circuit assembly to thereby create a bounded field of view for said at least one first and second photosensors.

5. The photosensor arrangement of claim 1, and further comprising a diffuser support configured to protect the circuit assembly from mechanical fatigue.

6. The photosensor arrangement of claim 4, and further comprising a diffuser support configured to protect the output terminals from mechanical fatigue.

7. A photosensor arrangement comprising:

a circuit assembly having a vertical axis, said vertical axis defining a vertical plane, at least one first side, and at least one second side opposite said at least one first side, said at least one first side and said at least one second side being located substantially in said vertical plane;

at least one first photosensor attached to said at least one first side;

at least one second photosensor attached to said at least one second side;

a diffuser arranged substantially perpendicular to said vertical axis to overlie said at least one first and second photosensors, said diffuser being movable with respect to said at least one first and second photosensors, said diffuser including:

a diffuser support; and at least one diffuser lens mounted on said diffuser support;

an optic separator arranged substantially perpendicular to said vertical axis to overlie said diffuser and said circuit assembly to thereby create a bounded field of view for said at least one first and second photosensors; and a cap arranged substantially perpendicular to said vertical axis to overlie said optic separator; wherein said at least one first and second photosensors, respectively, have a substantially planar light-sensitive surface for receiving an input light from a source of light and further having an output terminal for providing an output electrical signal responsive to said input light; and wherein horizontal movement of said diffuser assembly determines a quantity of said input light transmitted to each of said at least one first and second photosensors.

8. The photosensor arrangement of claim 7, and further comprising a diffuser support configured to protect the output terminals from mechanical fatigue.

9. A heating/cooling system control element for a vehicle, the heating/cooling system control element comprising:

a circuit assembly having a vertical axis, said vertical axis defining a vertical plane, at least one first side, and at least one second side opposite said at least one first side, said at least one first side and said at least one second side being located substantially in said vertical plane;

at least one first photosensor attached to said at least one first side;

at least one second photosensor attached to said at least one second side; and a diffuser arranged substantially perpendicular to said vertical axis to overlie said at least one first and second photosensors, said diffuser being movable with respect to said at least one first and second photosensors; wherein said at least one first and second photosensors, respectively, have a substantially planar light-sensitive surface for receiving an input light from the source of light and further having an output terminal for providing an output electrical signal responsive to said input light; and wherein horizontal movement of said diffuser assembly determines a quantity of said input light transmitted to each of said at least one first and second photosensors.

10. The heating/cooling system control element of claim 9, wherein said diffuser comprises:

a diffuser support; and at least one diffuser lens mounted on said diffuser support.

11. The heating/cooling system control element of claim 10, and further comprising a cap arranged substantially perpendicular to said vertical axis to overlie said diffuser and said circuit assembly.

12. The heating/cooling system control element of claim 9, and further comprising an optic separator arranged substantially perpendicular to said vertical axis to overlie said diffuser and said circuit assembly to thereby create a bounded field of view for said at least one first and second photosensors.

13. The heating/cooling system control element of claim 9, and further comprising a diffuser support configured to protect the output terminals from mechanical fatigue.

14. The heating/cooling system control element of claim 13, and further comprising a diffuser support configured to protect the output terminals from mechanical fatigue.

* * * * *